United States Patent
Nandan et al.

(10) Patent No.: US 9,129,344 B2
(45) Date of Patent: Sep. 8, 2015

(54) METHOD AND SYSTEM FOR PADDING IN A VIDEO PROCESSING SYSTEM

(75) Inventors: Niraj Nandan, Bangalore (IN); Sivakumar Ramaiyan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1042 days.

(21) Appl. No.: 13/028,183

(22) Filed: Feb. 15, 2011

(65) Prior Publication Data

US 2011/0202695 A1     Aug. 18, 2011

(30) Foreign Application Priority Data

Feb. 15, 2010 (IN) .............................. 366/CHE/2010

(51) Int. Cl.
    *G06T 1/00*       (2006.01)

(52) U.S. Cl.
    CPC ........................................ *G06T 1/00* (2013.01)

(58) Field of Classification Search
    CPC H04N 19/00666; H04N 19/51; H04N 19/563
    USPC ......................................... 345/531, 537, 538
    See application file for complete search history.

(56) References Cited

U.S. PATENT DOCUMENTS

| 2003/0174252 | A1* | 9/2003 | Bellas et al. | 348/699 |
| 2005/0053290 | A1* | 3/2005 | Wada et al. | 382/233 |

\* cited by examiner

*Primary Examiner* — Hau Nguyen
(74) *Attorney, Agent, or Firm* — John R. Pessetto; Charles A. Brill; Frank D. Cimino

(57) ABSTRACT

A method and system for padding an array of data on-the-fly in a direct memory access (DMA) controller. The method includes receiving the array of data in the DMA controller. The method also includes identifying edge groups of pixels at edges of the array of data and creating a padded region of data words along a periphery of the array of data. Each data word includes pixels of a corresponding edge group. The data words are then stored in a memory along with received array of data. Further, the method includes sending a request for padded data at a location in the memory, the padded data defining the array of data and the padded region of data words. Further, the method also includes translating the location of the padded data to addresses of one of, the data words and the array of data in the memory and retrieving the padded data at the addresses in the memory.

17 Claims, 9 Drawing Sheets

METHOD AND SYSTEM FOR PADDING IN A VIDEO PROCESSING SYSTEM

This application claims priority from Indian Provisional Application Serial No. 366/CHE/2010 filed Feb. 15, 2010, entitled "EFFICIENT PADDING AT IMAGE OR VIDEO OBJECT BOUNDARIES", which is incorporated herein by reference in its entirety.

TECHNICAL FIELD

Embodiments of the disclosure relate to the field of padding in a video processing system.

BACKGROUND

In video processing systems, padding is a process of extrapolating or extending pixel values around edges of a video frame. This helps in processing of a video frame beyond its picture boundary. Padded frame is required at the time of motion estimation (ME) and motion compensation (MC). Different video processing systems adopt different data flows to create padded frame and make them available for motion estimation or motion compensation. Typically a processor performs the horizontal padding before writing out frame into external memory and does vertical padding by memory copy of top line of the frame into external memory. This method is costly in terms of memory as well as performance. In few advanced systems, hardware accelerators that require extended pixels, perform padding locally on currently processed part of the video frame. Padding operation can also be applicable for frame filling, so that received frame width becomes multiple of width of processing unit of block, for example a macro block. In such cases, padding logic units would have to be instantiated in more than one place, resulting in more area. Such a method could also impact the processing cycles of the particular hardware accelerator. There is no flexibility to experiment with data flow without performance loss inside video processor. Hence, there is a need for a common padding unit that performs padding on the fly in a video processing system with reduced memory bandwidth, with reduced processing cycles and with minimal area. It is also desirable that the padding process be generic and flexible enough to allow experimentation with data flow to create padded frame and support feature similar to padding. It should also be extendible to support padding along with other data processing such as compression and decimation.

SUMMARY

An example of a method of padding an array of data on-the-fly in a direct memory access (DMA) controller includes receiving the array of data in the DMA controller. The method includes identifying edge groups of pixels at edges of the array of data and creating a padded region of data words along a periphery of the array of data. Each data word includes pixels of a corresponding edge group. The data words are then stored in a memory along with received array of data. Further, the method includes sending a request for padded data at a location in the memory, the padded data defining the array of data and the padded region of data words. Further, the method also includes translating the location of the padded data to addresses of one of, the data words and the array of data in the memory and retrieving the padded data at the addresses in the memory.

An example of a video processor includes a direct memory access controller operable to perform at least one of, pad, compress and decimate an array of data. The direct memory access controller includes a padding unit and a padding memory. The video processor also includes an address translator coupled to the direct memory access controller. Further, the video processor includes a CPU coupled to the direct memory access controller and a data storage memory.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the disclosure.

DETAILED DESCRIPTION OF THE EMBODIMENTS

It should be observed that method steps and system components have been represented by conventional symbols in the figures, showing only specific details that are relevant for an understanding of the present disclosure. Further, details that may be readily apparent to person ordinarily skilled in the art may not have been disclosed. In the present disclosure, relational terms such as first and second, and the like, may be used to distinguish one entity from another entity, without necessarily implying any actual relationship or order between such entities.

Various embodiments discussed in this disclosure pertain to a method and system for padding in a video processing system.

Figure 1:
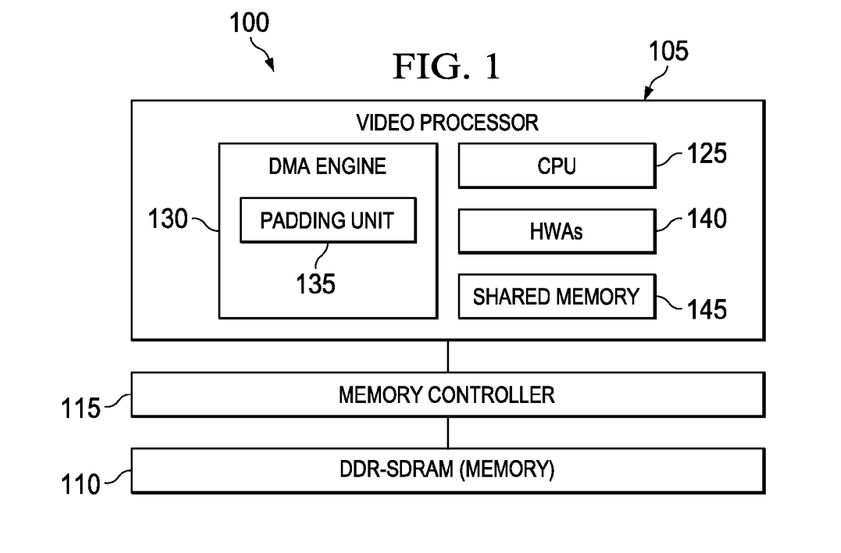
FIG. 1 is a block diagram of a video processing system, in accordance with which various embodiments can be implemented.

As shown in FIG. 1, a video processing system 100 includes a video processor 105, a memory 110, and a memory controller 115 coupled to both the video processor 105 and the memory 110. Example of the memory 110 includes, but is not limited to, a Double Data Rate-Synchronous Dynamic Random Access Memory. The video processor 105 includes a central processing unit (CPU) 125, a direct memory access (DMA) engine 130 with an inbuilt padding unit 135, one or more hardware accelerators (HWAs) 140 and a shared memory 145. Herein, the DMA engine can also be referred as DMA controller. The shared memory 145 is utilized by the CPU 125, the DMA engine 130 and the one or more hardware accelerators 140. The memory controller 115 is used by the DMA engine 130 to control direct access of the DDR-SDRAM 110. The DMA engine 130 allows data transfer at a much faster rate between the memory 110 and the shared memory 145. In an embodiment, the padding unit 135 within the DMA engine 130 performs the padding operation either before writing data into the DDR-SDRAM 110 or after reading from DDR-SDRAM 110 and before writing into the shared memory 145.

In the embodiment, the padding unit 135 creates a padded region around the data. Padding is defined as extrapolating edge pixels of the data in configured direction and for configured dimension. A unit of padding can be one or more pixels. The data can be a one or more blocks of data corresponding to a video frame, or the data may correspond to edge regions of a reference frame that is used for predicting a current frame or it may be any other data required to be padded as instructed by the CPU 125. For example, the CPU 125 may require padding of a block of data during processing. The CPU 125 requests the DMA engine 130 to perform padding operation for a block of data in the DDR-SDRAM 110. The DMA accessed the block of data from the DDR-SDRAM 110 and performs padding using the padding unit 135. The block of data with the padded region is then transferred to the shared memory 145 for further processing.

Figure 2:
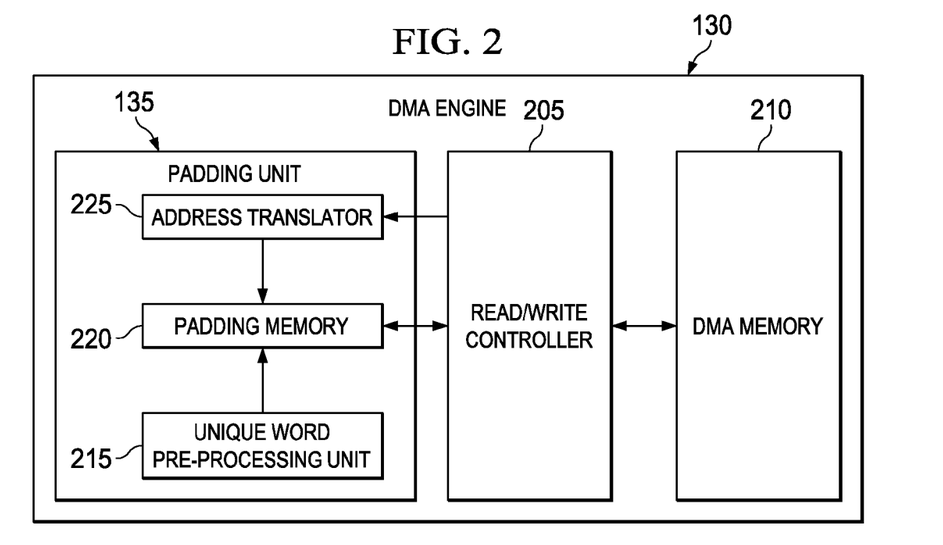
FIG. 2 is a block diagram of a DMA engine, in accordance with which various embodiments can be implemented.

The DMA engine 130 and the padding unit 135 can include one or more units to perform specific functions and are explained in detail in FIG. 2.

As shown in FIG. 2, the DMA engine 130 includes the padding unit 135, a read/write controller 205 and a DMA memory 210. The padding unit 135 includes a unique word pre-processing unit 215 which also acts as padding controller, a padding memory 220 and an address translator 225.

In an embodiment, a data is to be read from an external memory (DDR-SDRAM 110) into a shared memory (shared memory 145) of a video processor with on the fly padding with a pre-programmed direction and dimension. Such a padding operation is referred as In-Padding. The data is read from an external memory into a shared memory with on the fly padding using the DMA engine 130. When the data in the external memory is accessed by the DMA engine 130, the padding operation is initiated by transferring the data to the padding memory 220 of the padding unit 135 using the read/write controller 205. The unique word pre-processing unit 215 within the padding unit 135 creates a padded region of data words around edge pixels of the data. Each data word includes data of a corresponding edge pixel. The corresponding edge pixel can refer to a horizontal edge pixel, a vertical edge pixel or a diagonal edge pixel. Upon creating the padded region of data words around edge pixels of the data, the data words are stored in the padding memory 220. The padding unit 135 then informs completion of the padding operation to the DMA engine 130 and provides the address range for a padded data, the padded data representing the data and the padded region of data words. In some embodiments, only a required number of data words are created around the data and completion of the padding operation is informed to the DMA engine 130, and a virtual address range is provided for the padded data. The DMA engine 130 directs the read/write controller 205 to transfer the padded data to the DMA memory 210, sequencing the transfer in blocks of size limited by size of the DMA memory 210 as post padding, size of the padded data could be significantly larger than the data received for padding. The read/write controller 205 generates one or more requests for the padded data words and sends the requests to the address translator 225. The one or more requests include the address information of the padded data. The address translator 225 maps the one or more requests to the memory location of the padded data. In an embodiment, the address translator 225 maps the one or more requests to the memory location of the padded region of data words. In some embodiments, for a virtual address range, the address translator 225 maps the one or more requests to the memory location of edge pixels of the data. The mapped padded data is transferred to the DMA memory 210. Upon transfer of the padded data to the DMA memory 210, the padded data is transferred to the shared memory. In some embodiments, the transfer of padded data to the DMA memory 210 is performed individually in blocks of data, and then the padded data is transferred to the shared memory. The process is then repeated to transfer the remaining blocks of the padded data into the shared memory.

In another embodiment, data is to be read from the shared memory of the video processor into the external memory (DDR) along with on the fly padding with a pre-programmed direction and dimension. Such a padding operation is referred as Out-Padding. The data is read from the shared memory of the video processor into the external memory (DDR) along with on the fly padding using the DMA engine 130. When the data in the shared memory is accessed by the DMA engine 130, the padding operation is initiated by transferring the data to the padding memory 220 of the padding unit 135 using the read/write controller 205. The unique word pre-processing unit 215 within the padding unit 135 creates a padded region of data words around edge pixels of the data. Each data word includes data of a corresponding edge pixel. The corresponding edge pixel can refer to a horizontal edge pixel, a vertical edge pixel or a diagonal edge pixel. Upon creating the padded region of data words around edge pixels of the data, the data words are stored in the padding memory 220. The padding unit 135 then informs completion of the padding operation to the DMA engine 130 and provides the address range for a padded data, the padded data representing the data and the padded region of data words. In some embodiments, only a required number of the data words are created around the data and completion of the padding operation is informed to the DMA engine 130, and a virtual address range is provided for the padded data. The DMA engine 130 directs the read/write controller 205 to transfer the padded data to the DMA memory 210, sequencing the transfer in blocks of size limited by size of the DMA memory 210 as post padding, size of the padded data could be significantly larger than the data received for padding. The read/write controller 205 generates one or more requests for the requested padded data and sends the requests to the address translator 225. The one or more requests include the address information of the padded data. The address translator 225 maps the one or more requests to the memory location of the padded data. In an embodiment, the address translator 225 maps the one or more requests to the memory location of the padded region of data words. In some embodiments, for a virtual address range, the address translator 225 maps one or more requests to the memory location of edge pixels of the data. The mapped padded data is transferred to the DMA memory 210. Upon transfer of the padded data to the DMA memory 210, the padded data is transferred to the external memory. In some embodiments, the transfer of padded data to the DMA memory 210 is performed individually in blocks of data, and then the padded data is transferred to the external memory. The process is then repeated to transfer the remaining blocks of the padded data into the external memory.

In yet another embodiment, another padding operation is shown. When the DMA engine 130 transfers the data that needs to be padded to the padding memory 220, the padding unit 135 informs the DMA engine 130 of completion of the padding operation immediately and provides the address range for a padded data, the padded data representing the data and the padded region of data words. The DMA engine 130 then directs the read/write controller 205 to transfer the padded data to the DMA memory 210, sequencing the transfer in blocks of size limited by the DMA memory size 210 as post padding, size of the padded data could be significantly larger than the data received for padding. The read/write controller 205 generates one or more requests for the padded data and sends the requests to the address translator 225. The one or more requests include the virtual address information of the padded data. The address translator 225 maps the one or more requests to the memory location of edge pixels of the data. The address translator 225 also performs creation of mapped padded data on-the-fly by using pixel values of the data of retrieved memory location from mapped address. The mapped padded data is transferred to the DMA memory 210. In some embodiments, the transfer of padded data to the DMA memory 210 is performed individually in blocks of data. The padding operation can be performed during the transfer of data from external memory to shared memory or vice versa.

Figure 3:
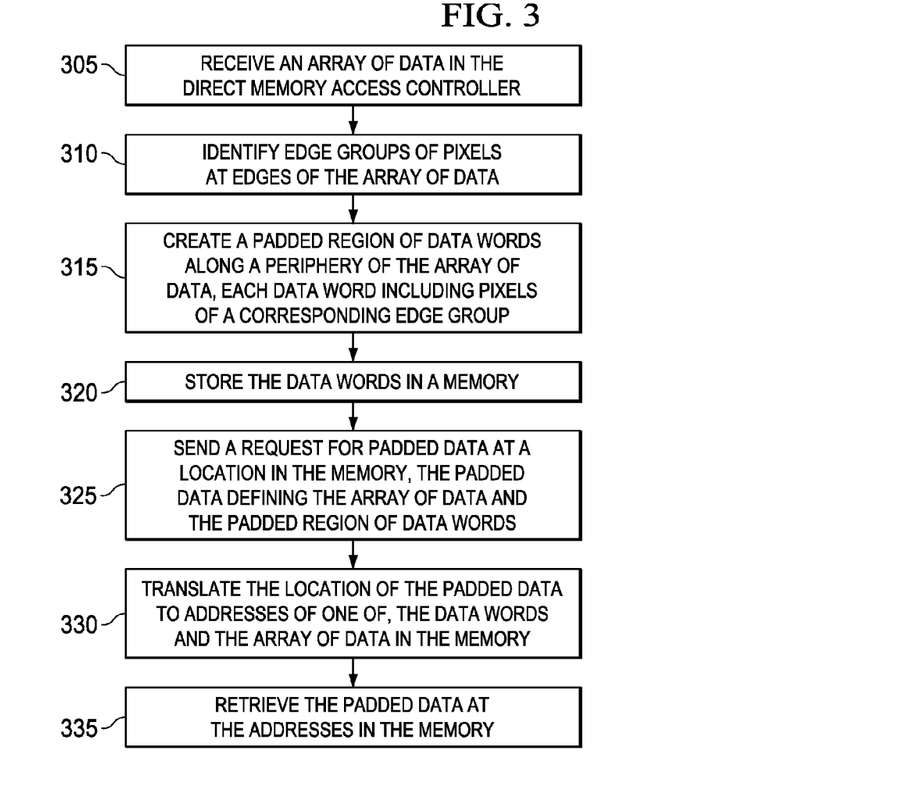
FIG. 3 is a flow chart illustrating a method of padding an array of data on-the-fly in a DMA controller.

Referring to FIG. 3, various steps involved in padding an array of data on-the-fly in a DMA controller are illustrated.

In an embodiment, a signal can be used for processing by a processing module for example, the CPU 125 or HWAs 140 of the video processor 105. For processing, the signal can be sourced from an internal memory of the video processor 105, for example the shared memory 145, and transferred to an external memory (DDR-SDRAM) 110 or vice versa. Example of the signal includes a video, a video sequence or portion of video frames. The processing by the CPU 125 or the HWAs 140 can include padding for single block of data or a plurality of data blocks of the signal. Here, the processor requires padding for the array of data. The CPU 125 on its own or on behalf of the HWAs 140 requests or directs the DMA controller to perform padding along with its transfer for the array of data and provides information such as source address and destination address of the array of data, padding length and the direction of padding.

The padding is performed during In-Padding or Out-Padding. The In-padding refers to the padding operation performed for the array of data in the DMA controller while it is read from an external memory (DDR-SDRAM 110) into a shared memory (shared memory 145) of a video processor with on the fly padding. The Out-padding refers to the padding operation performed for the array of data in the DMA controller while it is read from the shared memory of the video processor and write into the external memory (DDR).

In some embodiments, the padding can be performed for the data transfer between shared memories or the data transfer between external memories.

In some embodiments, the padding can be performed for the data sourced from the shared memory or the external memory, and after padding, padded data is stored in the shared memory or external memory respectively.

At step 305, the array of data is received in the DMA controller. The array of data is stored in a DMA memory, for example the DMA memory 210.

A copy of the array of data is then transferred from the DMA memory to a padding unit for a padding operation. The padding unit refers to the padding unit 135. Copying of the array of data is performed by means of a read-write controller, for example the read-write controller 205. The array of data is stored within a memory of the padding unit, for example the padding memory 220. A processing unit within the padding unit, for example the unique word pre-process unit 215, is operable to generate padded region of data words along a periphery of the array of data based on the direction of padding.

At step 310, edge groups of pixels at edges of the array of data are identified by the processing unit based on the direction of padding.

In an embodiment, the edge groups of data can refer to one or more pixel values at the edges of the array of data.

At step 315, the padded region of data words is created along the periphery of the array of data. Each data word includes the pixels of a corresponding edge group. The data words can include pixels corresponding to one of a horizontal edge group of pixels, a vertical edge group of pixels, or a diagonal edge group of pixels.

At step 320, the data words are stored in the memory of the padding unit upon completion of the padding operation. The padding unit informs the DMA engine of the completion of the padding operation. Additionally, the padding unit provides the DMA engine with an address range of a padded data in the memory, as if the complete padded data is available in the memory of the padding unit. The padded data represents the array of data and the padded region of data words.

In one embodiment, only a required number of the data words from the entire padded region of data words are created around the array of data and completion of the padding operation is informed to the DMA engine. The address range with the virtual addresses for the padded data is provided to the DMA engine for both source and destination. The address range includes addresses for the received array of data along with the created data words around edges of the array of data, and virtual addresses for rest of the padded region of data words.

In some embodiments, upon receiving the array of data for the padding operation, the padding unit informs the DMA engine of the completion of the padding operation. For example, padding in a vertical direction does not need to create any data words and hence the pre-processing unit simply informs completion of the padding operation as soon as the array of data is received. In such a case, address range with the virtual addresses for the entire padded region of data words is provided to the DMA engine.

At step 325, a request for the padded data at a location in the memory is sent by the DMA engine. The request is received by the read-write controller. The location corresponds to the address range provided by the padding unit. The read-write controller then requests an address translator, for example the address translator 225, within the padding unit for the padded data at the location in the memory.

In some embodiments, plurality of requests can be generated by the read-write controller in response to the request for the data by the DMA engine, the plurality of requests corresponding to blocks of the padded data. The plurality of requests is generated based on the data transfer capability within the DMA engine.

At step 330, the location of the padded data is translated to the addresses of one of the data words and the array of data in the memory. Translation of the padded data is performed by the address translator by identifying the data word at the location in the memory and accessing the address of the data word in the memory. The location in the memory can refer to one of, the addresses of padded region of data words or the array of data. For the virtual address range, the address translator maps the requested data to the memory location of one of the data words or the array of data.

At step 335, the padded data at the addresses in the memory are retrieved by the read-write controller and transferred to the DMA memory.

The padded data are transferred to one of the shared memory or the external memory.

In an embodiment, method of padding the array of data on-the-fly in the DMA controller described in FIG. 3 can be utilized along with a video compression process by the CPU 125 or the HWAs 140.

In another embodiment, the method of padding the array of data on-the-fly in the DMA controller described in FIG. 3 can be utilized along with a decimation process by the CPU 125 or the HWAs 140

In yet another embodiment, the method of padding the array of data on-the-fly in the DMA controller described in FIG. 3 can be utilized to perform frame filling by the CPU 125 or the HWAs 140. In general any use cases where data extrapolation of edge pixels is required during data transfer operation, the padding operation described in FIG. 3 can be utilized by the CPU 125 or the HWAs 140.

Figure 4:
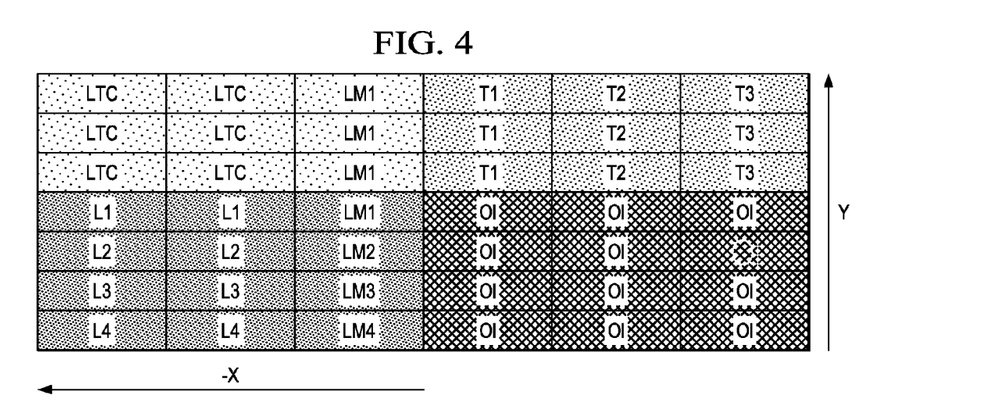
FIG. 4 is an exemplary illustration of a padding operation, in accordance with an embodiment.

FIG. 4 shows a padding operation, in accordance with an embodiment.

The illustrated figure shows a padded data with the unique data words representing the padded region. The input data is represented by original image (OI). For explanation purposes padding in only −X direction and +Y direction are considered. The padding unit 135 calculates a plurality of unique data words namely Left Top Corner (LTC), Left (L1, L2, L3, L4), and Left Misaligned (LM1, LM2, LM3, LM4) and stores the unique words in the padding unit 135 along with the input data, original image (OI). The DMA engine 130 does not create unique words for region T1, T2, T3 as they are available as part of the original image (OI). The plurality of unique data words represents the padded region. When the padding unit 135 receives a request for data corresponding to the word in the left top corner of padded region, the padding unit 135 points to the location of unique word LTC in memory by means of the address translator 225. When the padding unit 135 receives request for data corresponding to address in the horizontal rows of the padded region in the negative X direction, the address translator 225 maps the requested address to the address of one of the unique words L1, L2, L3, L4 based on the row. For example, if the padding unit 135 receives a request for data corresponding to address in second row of padded region in −X direction, the address translator 225 maps the requested address to address of the unique word L2. When the padding unit 135 receives a request for a word in the columns of padded region in the +Y direction, for example the region T1, T2, T3, the address translator 225 maps the requested address to address of the original image. When the padding unit 135 receives a request for a word in the padded left misaligned region, the address translator 225 maps the requested address to the address of one of the unique words LM1, LM2, LM3, LM4 corresponding to four rows of misaligned data in −X direction. In an embodiment DMA engine 130 creates unique words LM1, LM2, LM3, LM4 but stores them in the same location as input misaligned data as a result of which there are no extra memory requirements.

Figure 5:
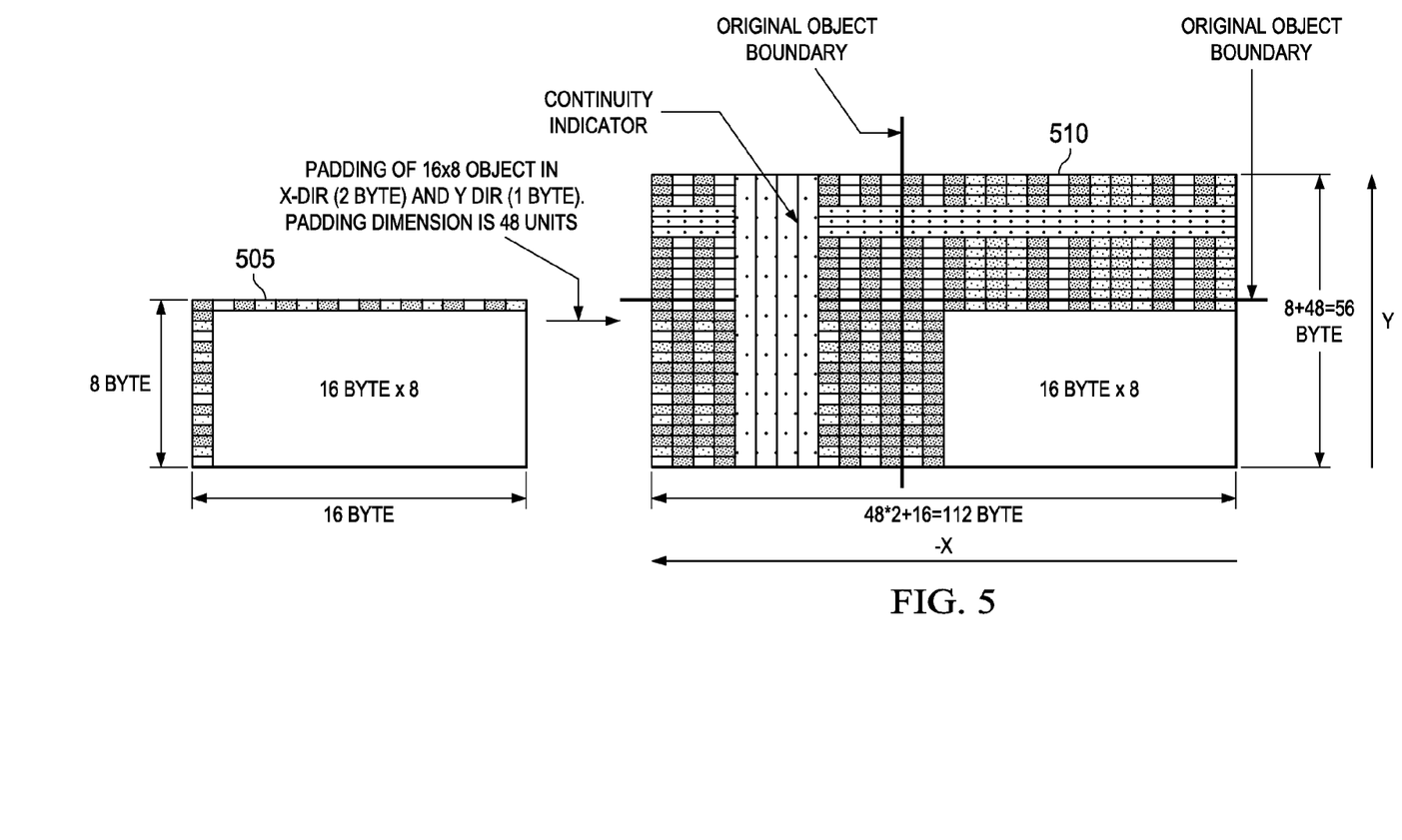
FIG. 5 is an exemplary illustration of a padding operation, in accordance with another embodiment.

FIG. 5 shows an exemplary padding operation in accordance with an embodiment.

For explanation purposes, consider a data block 505 of 16×8 byte. We assume 1-byte padding in the positive Y direction and 2-byte padding in negative X direction. Padded data after padding operation is shown by block 510. The padded data includes the data block 505 and its padded region of data words. Original object boundary in the block 510 shows the data block 505.

During padding operation, the DMA engine 130 sends the data block 505 to be padded to the padding unit 135. The padding unit 135 then informs the DMA engine 130 of completion of the padding operation. The padding unit 135 provides virtual address range corresponding to a padded region around the data block 505 including the addresses for the data block 505. A request is received from the DMA engine 130 for padded region around the data block 505. The padded region including the data block 505 is referred as the padded data 510. The request includes virtual addresses for the padded region around the data and the data block 505. The padding unit 135 maps the requested address onto address of the edge pixels of the data block 505. For example, if a request is received for a padded word in an $X^{th}$ row of the padded region of data words, the padding unit 135 will map the requested address to an address of edge pixel of the data block 505 in the same row. Similarly, if a request is received for a padded word in an $Y^{th}$ column of the padded region of data words, the padding unit 135 will map the requested address to an address of edge pixel of the data block 505 in the same column. Here the number of bytes occupied by the padded data and the number of working cycles used to perform padding are reduced since no physical address is used for storing the padded region and no cycles are wasted in creation of the padded region. After the padding operation, the padded data 510 is obtained.

FIGS. 6 through 11 illustrate an exemplary padding operation, in accordance with an embodiment.

Figure 6:
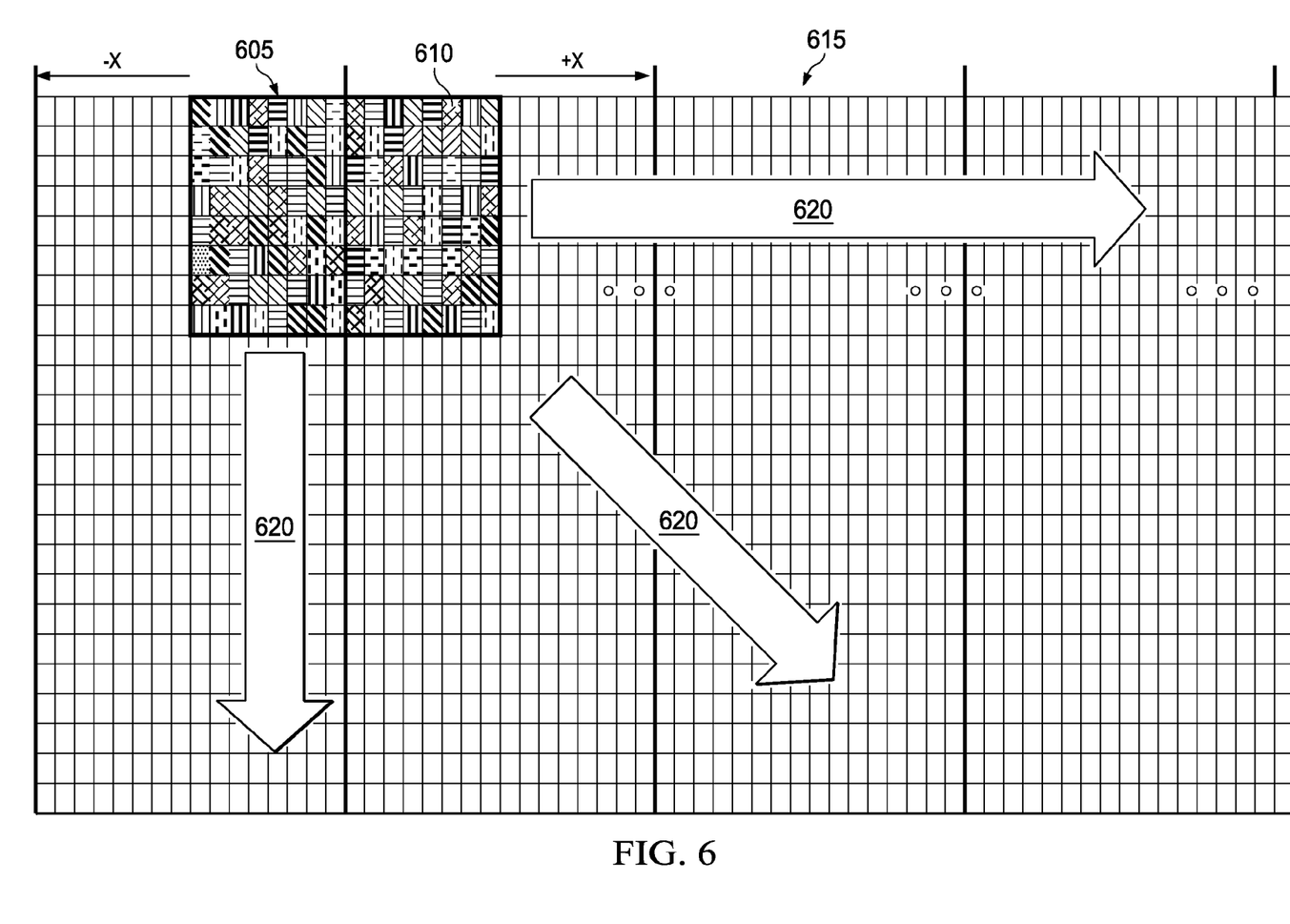
FIGS. 6 through 11 illustrate padding, in accordance with yet another embodiment.

In an embodiment, the CPU 125 directs the DMA engine to perform padding of a 2D object. The object to be padded is partitioned into plurality of data of size 16×8 byte. The partitioning of the object depends on system constraints such as max burst, address misalignment, and max height of the data. The maximum size of the partitioned data can be 128 byte as per the system constraints of implemented system. FIG. 6 is an exemplary illustration of a data 605 (Original Image) to be padded. The data 605 may correspond to a macroblock or partitions of a video frame or any video data that need to be padded as instructed by the CPU 125. The data 605 is broken into a plurality of objects for the padding operation. An exemplary object is shown by 610. In an embodiment, the object may refer to a pixel value. The illustrated example shown is for the padding operation of the array of data 605 representing a 16×8 byte data which is an original image. The DMA engine is made aware of the address misalignment of original prepadded data in post-padded destination location while performing padding operation for the plurality of data.

The padding operation is supported in plurality of directions 620 with possible combinations of X direction and Y direction.

Figure 7:
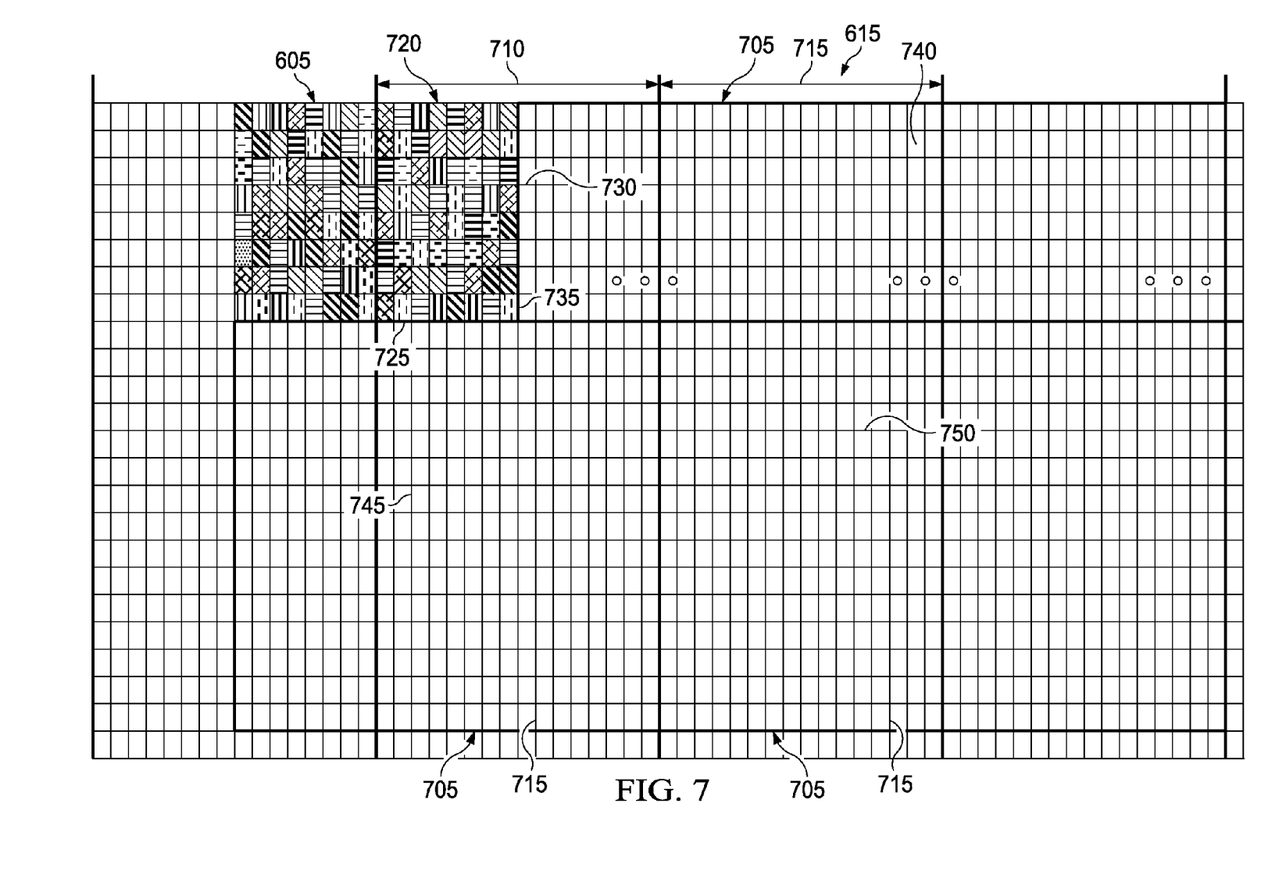

In the illustrated FIG. 6, address misalignment of the data 605 in a padded space 615 in both +X and −X direction is identified, which results in not completely filled words in either side of object The padded space 615 includes a plurality of regions 705 which includes partially padded data words 710 and fully padded data words 715 as shown in FIG. 7. The partially padded data words 710 shares at least one part 720 of the data 605 in a same row. A remaining portion of the partially padded data words 710 needs to be created by extrapolating the objects in the part 720.

The fully padded data words 715 are completely created using the padding operation. The fully padded data words 715 may be created from one or more edge pixels, for example a horizontal edge pixel 730, a vertical edge pixel 725, and a corner edge pixel 735 of the data word 705. The part of fully padded data words 715 created using the horizontal edge pixels is refereed as a side padded region 740. The part of fully padded data words 715 created using the vertical edge pixels is refereed as a vertical padded region 745. The part of fully padded data words 715 created using the corner edge pixel 735 is refereed as a corner padded region 750.

Figure 8:
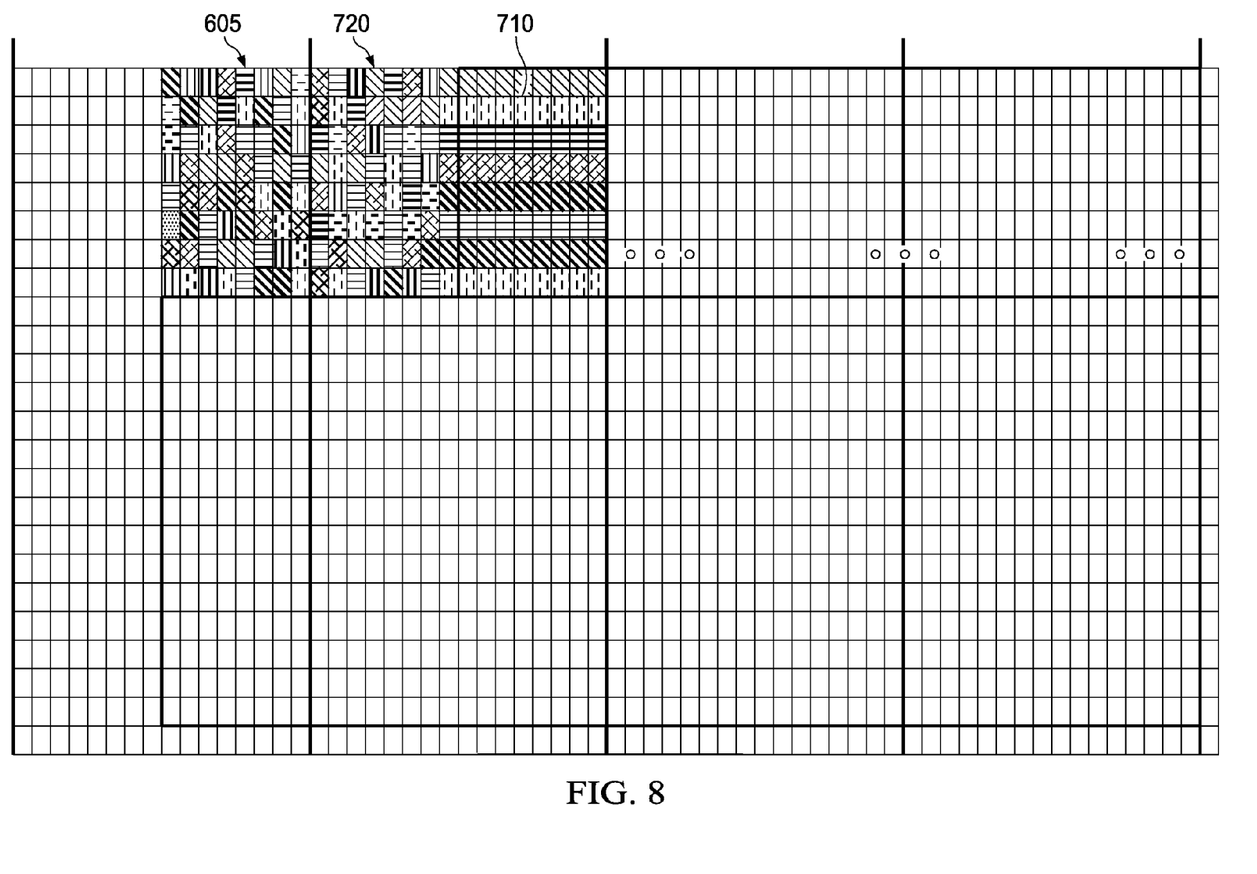

Referring to FIG. 8, the partially padded data words 710 shares at least one part of the data word 720 in the same row. For the given example of the 16×8 data 605 which is the original image, the partially padded data word 710 shares the original image 605 in the same row along the padded direction and the remaining portion of 8 bytes of the partially padded data word 710 are created by extrapolating the corresponding edge pixels. In the illustration, the partially padded data words 710 include 8 partially padded data words corresponding to 8 horizontal edge pixels of the data 605.

Figure 9:
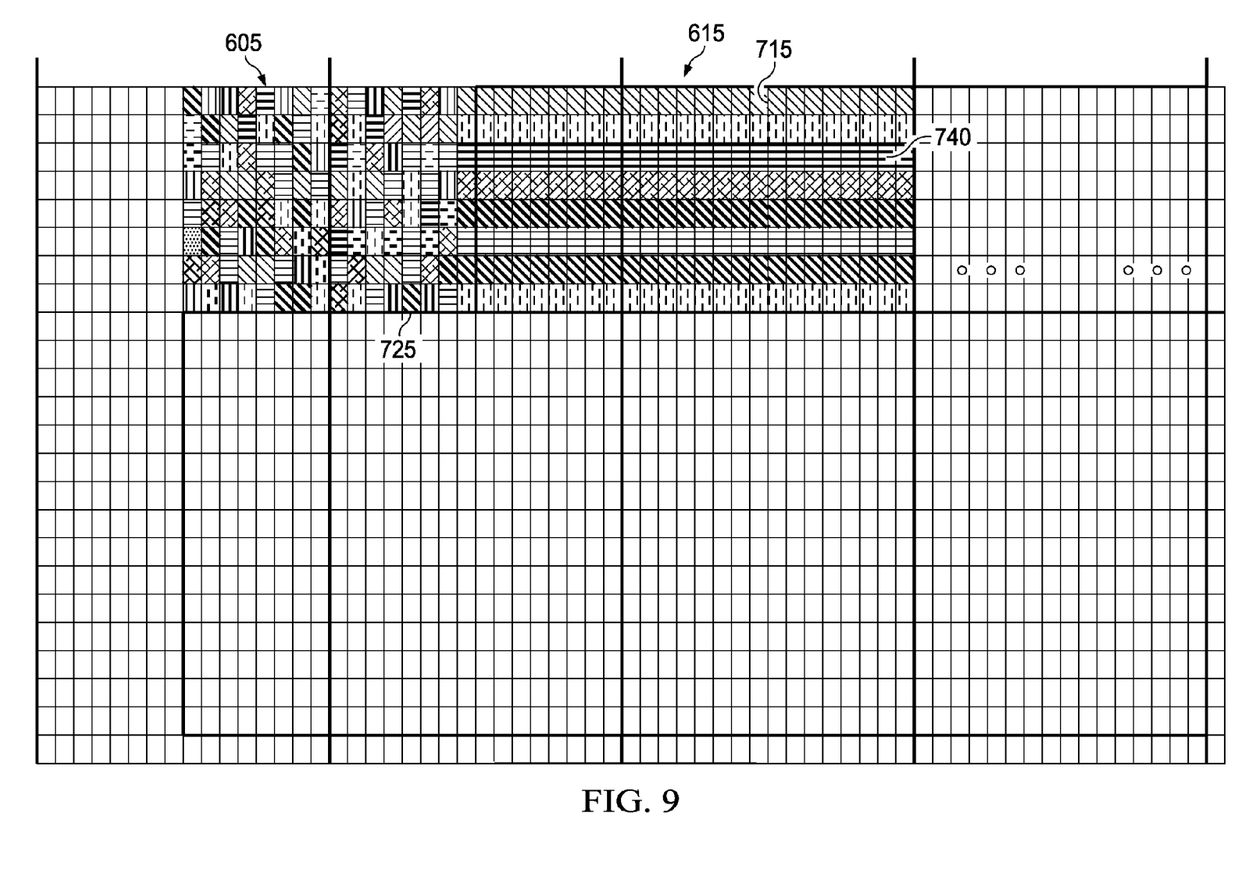

Creation of the fully padded data word 715 using one of the horizontal edge pixels in the padded space 715 is shown in FIG. 9. The side padded region 740 created from the original image 605 includes 8 unique fully padded data words.

Figure 10:
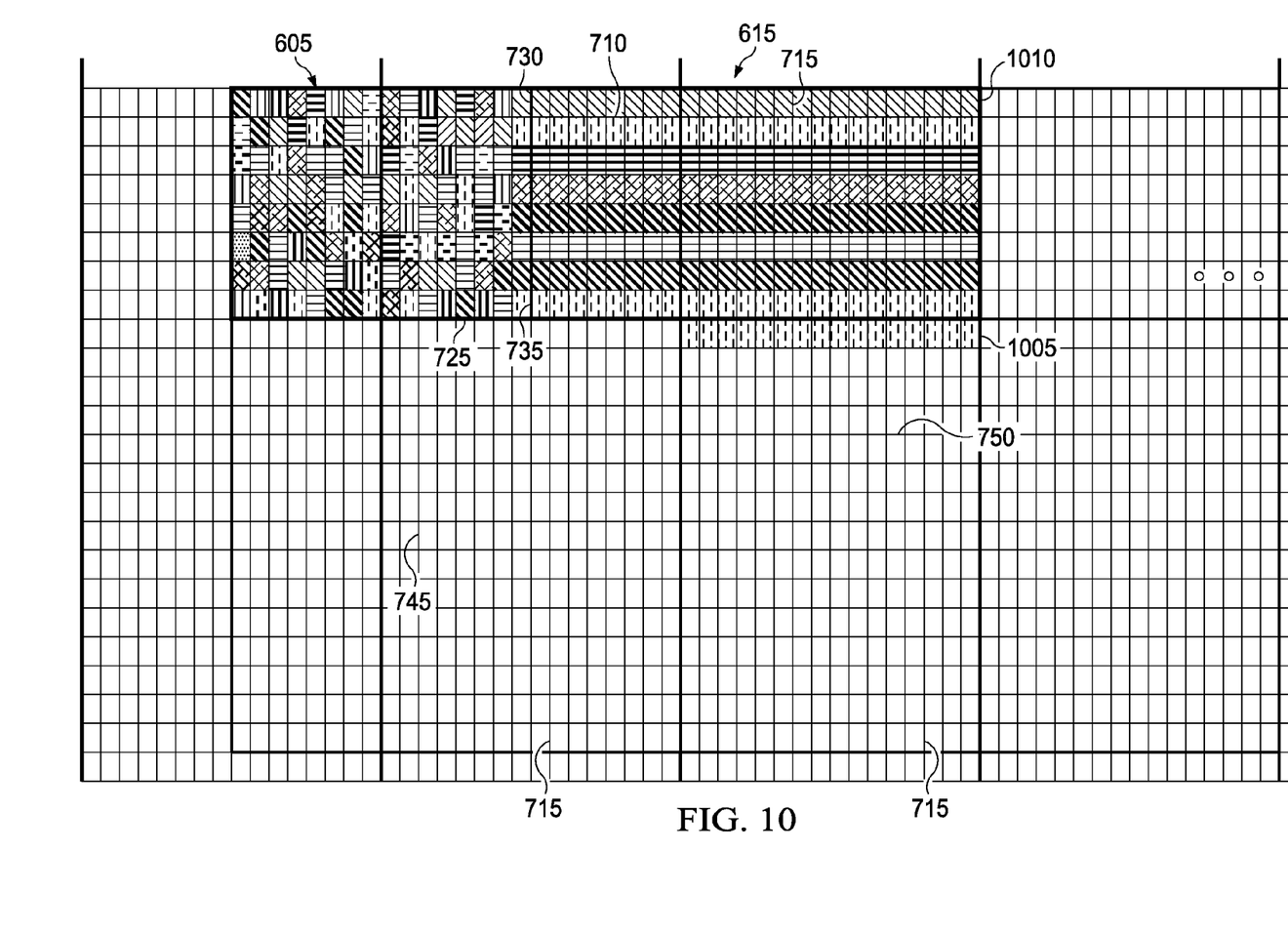

FIG. 10 shows the padded space 615 filled with the fully padded data words created using the horizontal edge pixels 730 of the data 605. The resultant corner padded region 750 has a single unique fully padded corner data word 1005. The single unique fully padded corner data word 1005 and the data words in block 1010 represent the unique data words created. At this instant, the rest of the padded space 615 can be created by mapping the data words to 17 data words already created. In the embodiment, the padding unit 135 will inform the DMA engine 130 of completion of the padding operation. The padding unit 135 will provide the address range for padded data, the padded data includes the data 605 and padded region of data words.

The DMA engine 130 then requests the padding unit 135 for data in the address range. In an embodiment, DMA engine 130 breaks the fully padded space into smaller blocks of data limited by the maximum size of DMA memory and submits transfer of these blocks to read-write controller. In an embodiment, the read-write controller generates one or more requests for the data in the address range to the padding unit 135. The padding unit gets the data for each request as per the algorithm shown in Table. 1:

TABLE 1

For a requested address:
    If the requested address is in Original Image range then data to be transferred is one of Original Image data (depending upon y difference);
    Else
        if the requested address is in Side Padded region then data to be transferred is one of Side Padded word (depending on y value);
    Else
        if the requested address is in Vertical Padded region data to be transferred is Vertical Padded word;
    Else
        if the requested address is in Corner Padded region data to be transferred is Corner Padded word.

The fully padded data is transferred into DMA memory sequentially as per the requests generated by the read-write controller.

The DMA engine 130 then transfers contents of the DMA memory into configured destination and resubmits next set of blocks till it had finished task of transferring fully padded data into destination.

Figure 11:
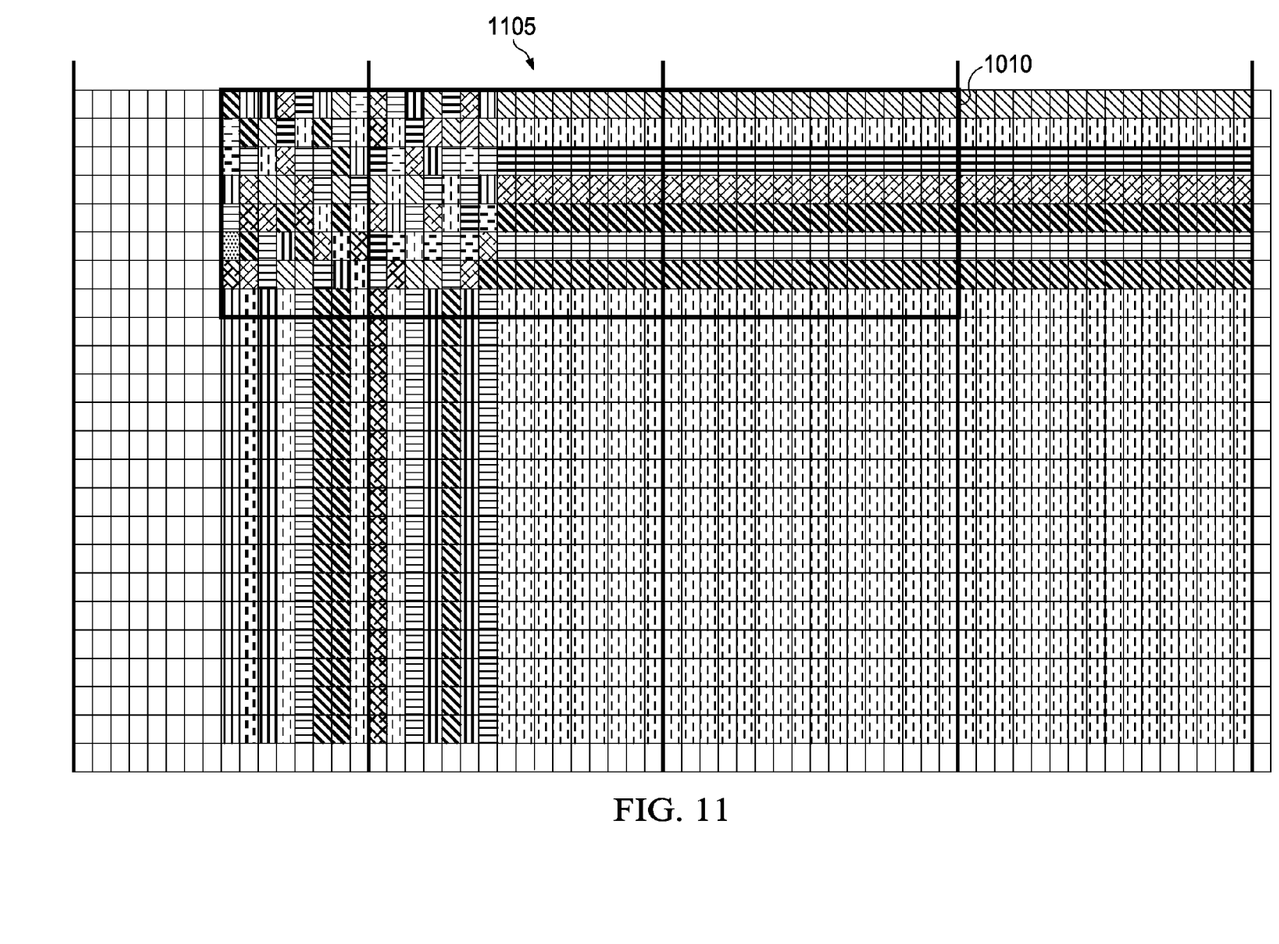

Thus the padding operation creates a fully padded data 1105 as shown in FIG. 11 into a configured destination.

By employing padding within a DMA results in a reduced CPU/HWA cycles during the padding operation. In addition, accesses to the DDR are also reduced. Moreover, utilizing the disclosed padding method, cycle requirement in creation and memory requirement for temporarily storing the padded data inside the DMA is also reduced thus improving the performance of the DMA and video processor. Here, in one such implementation a maximum of 17 clock cycles, and 400 byte memory is required by the padding unit to perform the padding operation.

In the foregoing discussion, each of the terms "coupled" and "connected" refers to either a direct electrical connection or mechanical connection between the devices connected or an indirect connection through intermediary devices.

The foregoing description sets forth numerous specific details to convey a thorough understanding of embodiments of the disclosure. However, it will be apparent to one skilled in the art that embodiments of the disclosure may be practiced without these specific details. Some well-known features are not described in detail in order to avoid obscuring the disclosure. Other variations and embodiments are possible in light of above teachings, and it is thus intended that the scope of disclosure not be limited by this Detailed Description, but only by the Claims.

What is claimed is:

1. A method of padding an array of data on-the-fly in a direct memory access controller, the method comprising:
    receiving the array of data in the direct memory access controller;
    identifying edge groups of pixels at edges of the array of data;
    creating a padded region of data words along a periphery of the array of data, each data word comprising pixels of a corresponding edge group;
    storing the data words in a memory;
    sending a request for padded data at a location in the memory, the padded data defining the array of data and the padded region of data words;
    translating the location of the padded data to addresses of one of, the data words and the array of data in the memory; and
    retrieving the padded data at the addresses in the memory.

2. The method as in claim 1, wherein the receiving comprises:
    transferring a copy of the array of data into the memory.

3. The method as in claim 1, wherein only required data words within the padded region of data words are created along the periphery of the array of data, and remaining data words within the padded region of data words defined as function of created data words.

4. The method as in claim 1, wherein the data words comprise pixels corresponding to one of a horizontal edge group of pixels, a vertical edge group of pixels, and a diagonal edge group of pixels.

5. The method as in claim 1, further comprising:
    providing information for the padded data in the memory, wherein the information includes the addresses of the padded data.

6. The method as in claim 1 wherein the translating comprises:
    identifying at least one of the data word and the array of data at the location in the memory, and
    accessing the address of the data word and the array of data in the memory.

7. The method as in claim 6, wherein the location in the memory refers to one of addresses of the padded region of data words, virtual addresses of the padded region of data words and addresses of the array of data.

8. The method as in claim 7 further comprising:
    mapping the virtual addresses to the corresponding data words in memory.

9. The method as in claim 1 further comprising:
    mapping the location of the padded data to the addresses of one of, the data words and the array of data in the memory.

10. The method as in claim 1, wherein one or more requests is sent for the retrieving of the padded data based on the direct memory access controller.

11. A video processor comprising:
a direct memory access controller operable to perform at least one of pad, compress and decimate an array of data, the direct memory access controller comprising a padding unit and a padding memory;
an address translator coupled to the direct memory access controller;
a CPU coupled to the direct memory access controller; and
a data storage memory;
wherein the padding unit is operable to pad the array of data and the padding memory stores data words;
wherein the pad comprises identifying edge groups of pixels at edges of the array of data and creating a padded region of data words along a periphery of the array of data, each data word comprises pixels of a corresponding edge group; and
wherein the padding unit is operable to provide information for the padded data in the memory, the information includes addresses of the padded data.

12. The video processor as in claim 11, wherein the data storage memory comprises a shared memory.

13. The video processor as in claim 11, wherein the direct memory access controller is operable to:
send a request for padded data at a location in the padding memory, the padded data defining the array of data and the padded region of data words.

14. The video processor as in claim 13, wherein the address translator is responsive to the request for the data to translate the location of the padded data to the addresses of one of, the data words and the array of data in the memory.

15. The video processor as in claim 14, wherein the direct memory access controller is operable to:
retrieve the padded data at the addresses in the memory.

16. The video processor as in claim 13, wherein the address translator is further operable to perform:
mapping of the location of the padded data to the addresses of one of, the data words and the array of data in the memory.

17. The video processor as in claim 11, wherein the video processor is operable to perform the pad on the array of data with one of a compression and a decimation process.

* * * * *